(12) United States Patent
Wegner

(10) Patent No.: US 9,709,724 B1
(45) Date of Patent: Jul. 18, 2017

(54) EDGE-LIT WAVEGUIDE AND MACRO OPTIC HYBRID

(71) Applicant: Scott David Wegner, Peachtree City, GA (US)

(72) Inventor: Scott David Wegner, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 120 days.

(21) Appl. No.: 14/659,079

(22) Filed: Mar. 16, 2015

Related U.S. Application Data

(60) Provisional application No. 61/953,285, filed on Mar. 14, 2014.

(51) Int. Cl.
*F21V 8/00* (2006.01)

(52) U.S. Cl.
CPC ........... *G02B 6/0028* (2013.01); *G02B 6/002* (2013.01)

(58) Field of Classification Search
CPC .... G02B 6/0028; G02B 6/002; G02B 6/0045; G02B 6/0046; G02B 6/0075; G02B 6/0023; G02B 6/0026; G02B 6/0001; G02B 6/00; F21V 2200/00; G02F 1/133524; G02F 1/133615; F21K 9/61; G01N 2201/08
See application file for complete search history.

(56) References Cited

U.S. PATENT DOCUMENTS

| | | | | |
|---|---|---|---|---|
| 5,027,258 A * | 6/1991 | Schoniger | ............ | G02B 6/0023 362/629 |
| 6,669,349 B2 * | 12/2003 | Mabuchi | .............. | G02B 6/0038 362/23.15 |
| 8,002,450 B2 * | 8/2011 | Van Ostrand | ........ | G02B 6/0028 362/606 |

* cited by examiner

*Primary Examiner* — Bao Q Truong
(74) *Attorney, Agent, or Firm* — King & Spalding LLP

(57) ABSTRACT

An edge-lit waveguide and macro optic hybrid structure includes a waveguide segment having a light receiving surface and a light emitting surface. The light receiving surface and the light emitting surface are on opposite sides of the waveguide segment. The edge-lit waveguide and macro optic hybrid structure also includes a macro optic segment integrally formed with the waveguide segment. A light emitting surface of the macro optic segment extends out beyond the waveguide segment on a side of the waveguide segment.

8 Claims, 5 Drawing Sheets

EDGE-LIT WAVEGUIDE AND MACRO OPTIC HYBRID

CROSS REFERENCE TO RELATED APPLICATIONS

The present application claims priority under 35 U.S.C. Section 119(e) to U.S. Provisional Patent Application No. 61/953,285, filed Mar. 14, 2014, and titled "Edge-Lit Waveguide and Macro Optic Hybrid," the entire content of which is incorporated herein by reference.

TECHNICAL FIELD

The present disclosure relates generally to edge lighting, in particular to an edge-lit hybrid structure that is a combination of a waveguide and a macro optic.

BACKGROUND

An edge-lit luminaire commonly has an edge-lit waveguide (or sometimes referred to as a light guide or a light emitting panel). Generally, a portion of the light from a light emitting diode (LED) that enters the waveguide through one side of the waveguide exits on one or more light emitting sides of the waveguide. In some situations, the light from the edge-lit waveguide may not provide a desired level of illumination to a particular area illuminated by the luminaire. For example, the edge-lit waveguide may not provide adequate illumination to an area directly below the edge-lit luminaire when the luminaire is designed to emit most of the light through vertical sides of the edge-lit waveguide.

One approach to providing improved illumination for an area at a particular side of the edge-lit waveguide is to install additional luminaires. However, installing multiple luminaires may not be practical. For example, space may not be available for installation of additional luminaires. Layout constraints and additional cost may also make installing multiple luminaires undesirable.

Thus, a solution that provides improved illumination at reasonable cost and space requirements may be desirable.

SUMMARY

The present disclosure relates generally to lighting solutions. In an example embodiment, an edge-lit waveguide and macro optic hybrid structure includes a waveguide segment having a light receiving surface and a light emitting surface. The light receiving surface and the light emitting surface are on opposite sides of the waveguide segment. The edge-lit waveguide and macro optic hybrid structure also includes a macro optic segment integrally formed with the waveguide segment. A light emitting surface of the macro optic segment extends out beyond the waveguide segment on a side of the waveguide segment.

In another example embodiment, an edge-lit waveguide and macro optic hybrid assembly for a lighting fixture includes a waveguide having a light receiving surface and a light emitting surface. The edge-lit waveguide and macro optic hybrid assembly also includes a macro optic structure including a first wing segment and a second wing segment. A light emitting surface of the macro optic structure faces the light receiving surface of the waveguide. A light emitting surface of the first wing segment extends out beyond the waveguide on a first side of the waveguide. A light emitting surface of the second wing segment extends out beyond the waveguide on a second side of the waveguide.

In another example embodiment, an edge-lit waveguide and macro optic hybrid assembly for a lighting fixture includes a waveguide having a light receiving surface and a light emitting surface. The edge-lit waveguide and macro optic hybrid assembly also includes a first macro optic wing and a second macro optic wing. The light receiving surface of the waveguide is between the first macro optic wing and the second macro optic wing. A light emitting surface of the first macro optic wing extends out beyond the waveguide on a first side of the waveguide. A light emitting surface of the second macro optic wing extends out beyond the waveguide on a second side of the waveguide.

These and other aspects, objects, features, and embodiments will be apparent from the following description and the appended claims.

BRIEF DESCRIPTION OF THE DRAWINGS

Reference will now be made to the accompanying figures, which are not necessarily to scale, and wherein.

Figure 1:
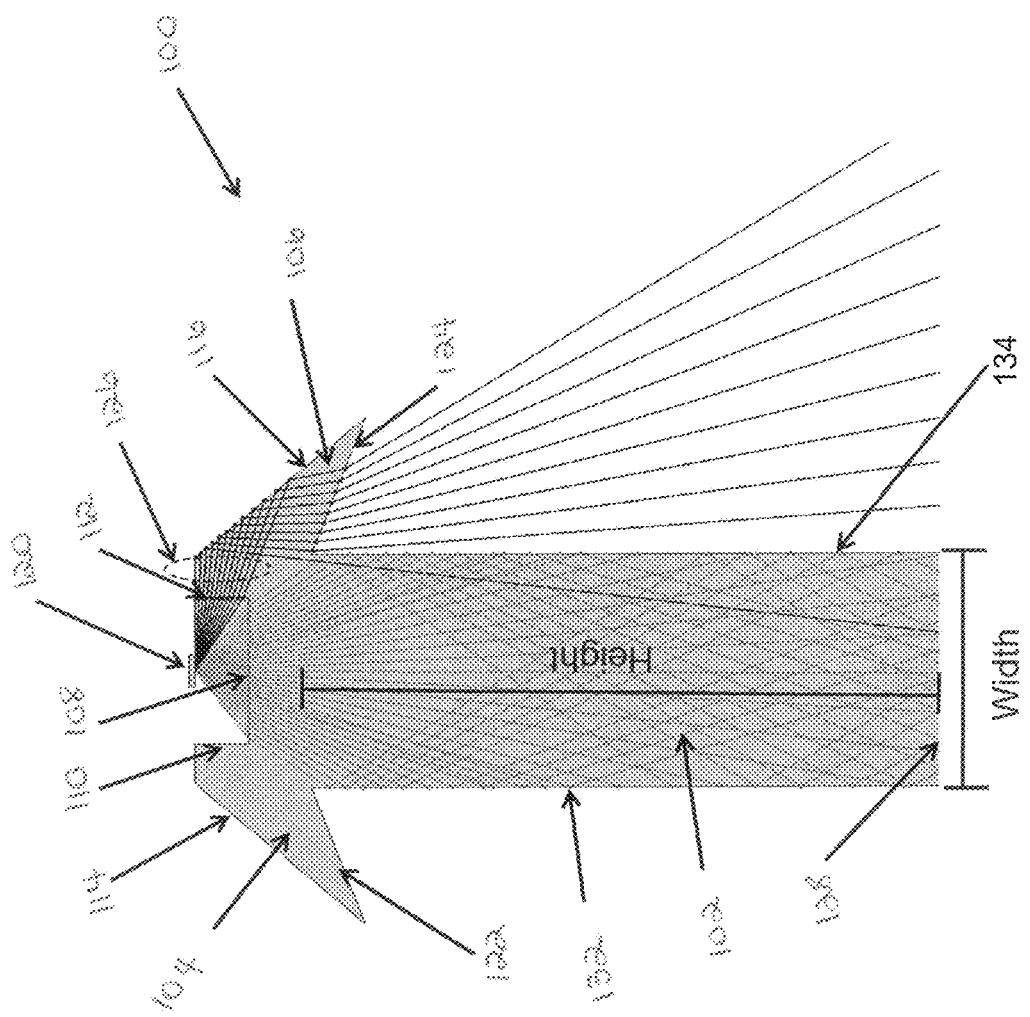
FIG. 1 is a section view of a waveguide and macro optic hybrid structure according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF THE EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

Turning now to the figures, particular embodiments are described. FIG. 1 illustrates a section view of a waveguide and macro optic hybrid structure 100 according to an example embodiment. The waveguide and macro optic hybrid structure 100 includes a waveguide segment 102, a first macro optic segment 104 and a second macro optic segment 106. The waveguide and macro optic hybrid structure 100 includes light receiving surfaces 108, 110, 112 through which light may enter the waveguide segment 102, the first macro optic segment 104, and the second macro optic segment 106, respectively. The waveguide and macro optic hybrid structure 100 may be made from acrylic or other similar material known to those of ordinary skill in the art with the benefit of this disclosure. The waveguide and macro optic hybrid structure 100 may be made by methods such as molding. In some example embodiments, the waveguide and macro optic hybrid structure 100 may be extruded as a single piece.

In some example embodiments, the waveguide segment 102 includes a light emitting surface 128. For example, the light emitting surface 128 may face an area or a surface (e.g., floor) to be illuminated by a lighting fixture that includes the waveguide and macro optic hybrid structure 100. The waveguide segment 102 also includes light emitting surfaces 132, 134. For example, the surfaces 132, 134 may emit a large portion of the light that enters the waveguide segment 102. A relatively small portion of the light that enters the waveguide segment 102 may exit through the light emitting surface 128.

In some example embodiments, the first macro optic segment 104 may include a light reflecting surface 114 and a light emitting surface 122. As illustrated in FIG. 1, the first macro optic segment 104 may extend/protrude out beyond the surface 132 of the waveguide segment 102 on a broad side of the waveguide segment 102. To illustrate, the light emitting surface 122 of the macro optic segment 104 extends out beyond the light emitting surface 132 of the waveguide segment 102. For example, light that enters the first macro optic segment 104 through the light receiving side 110 may be reflected off the light reflecting surface 114 and exit through the light emitting surface 122.

In some example embodiments, the second macro optic segment 106 may include a light reflecting surface 116 and a light emitting surface 124. As illustrated in FIG. 1, the second macro optic segment 106 may extend/protrude out beyond the surface 134 of the waveguide segment 102 on another broad side of the waveguide segment 102. To illustrate, the light emitting surface 124 of the macro optic segment 106 extends out beyond the light emitting surface 134 of the waveguide segment 102. For example, light that enters the second macro optic segment 106 through the light receiving side 112 may be reflected off the light reflecting surface 116 and exit through the light emitting surface 124.

In some example embodiments, different portions of light emitted by a light source 120 (e.g., a light emitting diode (LED), a printed circuit board including one or more LEDs, etc.) enter the waveguide segment 102, the first macro optic segment 104, and the second macro optic segment 106. To illustrate, a portion of the light from the light source 120 may enter the waveguide segment 102 through the light receiving surface 108. Another portion of the light from the light source 120 may enter the first macro optic segment 104 through the light receiving side 110. Yet another portion of the light from the light source 120 may enter the second macro optic segment 106 through the light receiving side 112.

Some of the light from the light source 120 that enters the waveguide segment 102 through the light receiving surface 108 is emitted through the light emitting surface 128 of the waveguide segment 102 toward a surface below the waveguide and macro optic hybrid structure 100. For example, some of the light that enters the waveguide segment 102 through the light receiving surface 108 may be reflected off the broad surfaces 132, 134 of the waveguide segment 102 and exit through the light emitting surface 128. For clarity of illustration, in FIG. 1, light emitted by the light source 120 is shown entering the second macro segment 106 but not the first macro optic segment 104.

In some example embodiments, some of the light that enters the first macro optic segment 104 through the light receiving side 110 is emitted through the light emitting side 122 of the first macro optic segment 104. To illustrate, the first macro optic segment 104 may be shaped such that light that enters the first macro optic segment 104 through the light receiving side 110 is reflected off the light reflecting surface 114 toward the light emitting surface 122, for example, as a result of total internal reflection (TIR). Light that is reflected off the light reflecting surface 114 may be emitted through the light emitting surface 122 in a general direction of the surface below the waveguide and macro optic hybrid structure 100.

In some example embodiments, the light reflecting surface 114 may have shapes other than the shape shown in FIG. 1. The distribution of light emitted through the light emitting surface 122 may depend on the particular shape of the light reflecting surface 114 as well as the shape of the light emitting surface 122.

Some of the light that enters the second macro optic segment 106 is emitted through the light emitting side 124 of the first macro optic segment 106. To illustrate, a portion 126 of the light from the light source 120 may enter the second macro optic segment 106 through the light receiving side 112, and the portion 126 of the light or a portion thereof may be emitted through the light emitting surface 124. For example, the second macro optic segment 106 may be shaped such that at least some of the portion 126 of the light is reflected off the light reflecting surface 116 toward the light emitting surface 124, for example, as a result of TIR. Light that is reflected off the light reflecting surface 116 may be emitted through the light emitting surface 124 in a general direction of the surface below the waveguide and macro optic hybrid structure 100.

In some example embodiments, the light reflecting surface 116 may have shapes other than the shape shown in FIG. 1. The distribution of light emitted through the light emitting surface 124 may depend on the particular shape of the light reflecting surface 116 as well as the shape of the light emitting surface 124.

Because light from the light source 120 is emitted toward an area below the waveguide and macro optic hybrid structure 100 through the light emitting surface 128 of the waveguide segment 102 as well as the light emitting surfaces 122, 124 of the macro optic segments 104, 106, a lighting fixture that includes the waveguide and macro optic hybrid structure 100 can provide an improved illumination of the area below the light emitting surface 128 of the waveguide segment 102. As illustrated with respect to the second macro optic segment 106, light emitted through the light emitting surface 124 is generally directed toward the area illuminated by light emitted through the light emitting surface 128 of the waveguide segment. Light emitted through the light emitting surface 122 of the first macro optic segment 104 is in a similar manner generally directed toward the same area illuminated by the light emitted through the light emitting surface 128.

In some example embodiments, the relative proportions of light that enters the waveguide segment 102 and the macro optic segments 104, 106 may be changed by changing the position of the light source 120 relative to the light receiving surfaces 108, 110, 112. For example, more of the light that is emitted by the light source 120 may be directed toward the light receiving surface 108 by positioning the light source 120 closer to the light receiving surface 108. Alternatively, the portion of the light that enters the macro optic segments 104, 106 may be increased by increasing, within a range, the space between the light source 120 and the light receiving surface 108.

In some example embodiments, the height of the waveguide segment 102 is approximately 4 inches, the width of the waveguide segment 102 is approximately 4 millimeters, and the length (i.e., depth into the page) of the waveguide segment 102 is approximately 4 feet. In some example embodiments, the light emitting surfaces 122, 124 of the macro optic segments 104, 106 may extend out approximately 4 mm beyond the respective surfaces 132, 134 of the waveguide. In some alternative embodiments, the waveguide and macro optic hybrid structure 100 may have different dimensions than the example dimensions provided above. In some example embodiments, the first macro optic segment 104 and the second macro optic segment 106 may extend longitudinally along the entire length of the waveguide segment 102. Alternatively, the first macro optic segment 104 and the second macro optic segment 106 may extend longitudinally for less than the entire length of the waveguide segment 102.

In some example embodiments, the waveguide and macro optic hybrid structure 100 may have shapes other than shown in FIG. 1 without departing from the scope of this disclosure. In some example embodiments, one or more of the surfaces 108, 110, 112, 114, 116, 122, and 124 may be flat, curved, or a combination of flat and curved surfaces. Similarly, in some example embodiments, one or more of the surfaces 128, 132, and 134 may be flat, curved, or a combination of flat and curved surfaces. In some example embodiments, the first macro optic segment 104 or the second macro optic segment 106 may be omitted.

Figure 2:
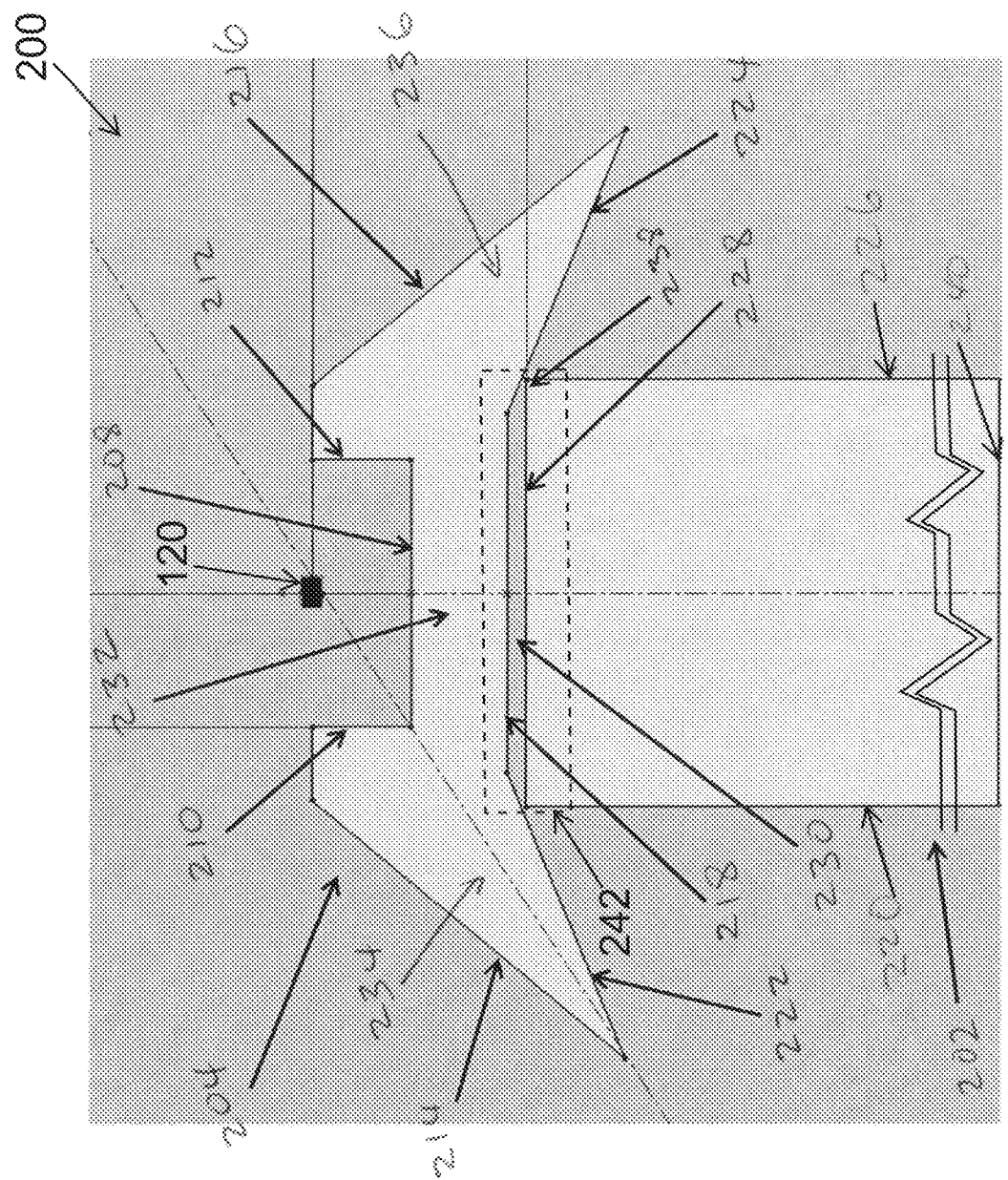
FIG. 2 is a section view of a waveguide and macro optic hybrid assembly according to an example embodiment.

FIG. 2 is a section view of a waveguide and macro optic hybrid assembly 200 according to an example embodiment. As illustrated in FIG. 2, the waveguide and macro optic hybrid assembly 200 includes a waveguide 202 and a macro optic structure 204. The waveguide 202 includes light emitting surfaces 220, 226, 240 and a light receiving surface 228. Light may enter the waveguide 202 through the light receiving surface 228. A relatively large portion of the light that enters the waveguide 202 through the light receiving surface 228 may be emitted through the light emitting surfaces 220, 226 of the waveguide 202, and a relatively small portion of the light that enters the waveguide 202 may be emitted through the light emitting surface 240 of the waveguide 202. In some example embodiments, light is emitted through the light emitting surface 240 of the waveguide 202 in a manner described with respect to the light emitting surface 128 of the waveguide segment 102 of FIG. 1.

In some example embodiments, the macro optic structure 204 includes a middle segment 232, a first wing segment 234, and a second wing segment 236. The middle segment 232 is between the first wing segment 234 and the second wing segment 236. The macro optic structure 204 also includes light receiving surfaces 208, 210, 212 and a light emitting surface 218. The first wing segment 234 of the macro optic structure 204 includes a light reflecting surface 214 and a light emitting surface 222. The second wing segment 236 of the macro optic structure 204 includes a light reflecting surface 216 and a light emitting surface 224. As illustrated in FIG. 2, the first wing segment 234 extends out beyond the light emitting surface 220 of the waveguide 202 on one side of the waveguide and macro optic hybrid assembly 200, and the second wing segment 236 extends out beyond a surface 226 of the waveguide 202 on an opposite side of the waveguide and macro optic hybrid assembly 200. To illustrate, the light emitting surface 222 of the macro optic structure 204 extends/protrudes out beyond the light emitting surface 220 of the waveguide 202, and the light emitting surface 224 of the macro optic structure 204 extends/protrudes out beyond the light emitting surface 226 of the waveguide 202.

A portion of the light from a light source 120 may enter the first wing segment 234 through the light receiving surface 210. Some of the light that enters the first wing segment 234 may be reflected off the light reflecting surface 214 (for example, as a result of TIR) and may be emitted through the light emitting surface 222. Another portion of the light from the light source 120 may enter the second wing segment 236 through the light receiving surface 212. Some of the light that enters the second wing segment 236 may be reflected off the light reflecting surface 216 (for example, as a result of TIR) and may be emitted through the light emitting surface 224.

A portion of the light from the light source 120 may enter the middle segment 232 of the macro optic structure 204 through the light receiving surface 208. Some of the light that enters the middle portion 232 may exit the middle segment 232 through the light emitting surface 218 of the macro optic structure 204 and enter the waveguide 202 through the light receiving surface 228 of the waveguide 202. The light that enters the waveguide 202 through the light receiving surface 228 passes through an air gap 230 formed between the waveguide 202 and the macro optic structure 204. In some example embodiments, a reflective material 242 may be positioned on one or two sides of the air gap 230 to reflect a portion of the light that exits the macro optic structure 204 through the light emitting surface 218 toward the light receiving surface 228 of the waveguide 202. Some of the light that enters the waveguide 202 through the light receiving surface 228 is emitted through the light emitting surfaces 220, 226, 240 of the waveguide 202.

Similar to the waveguide and macro optic hybrid structure 100 of FIG. 1, in some example embodiments, the portions of the light from the light source 120 emitted through the light emitting surfaces 222, 224 increase the illumination of the area/surface below the waveguide and macro optic hybrid assembly 200 (in the orientation shown in FIG. 2). Thus, in some example embodiments, a lighting fixture that includes the waveguide and macro optic hybrid assembly 200 may provide better illumination to the area below the light fixture when compared to a light fixture that includes the waveguide 202 without the macro optic structure 204.

In some example embodiments, the waveguide 202 and the macro optic structure 204 may be made from a suitable material such as acrylic using methods such as molding or other methods known to those of ordinary skill in the art with the benefit of the present disclosure. For example, in some example embodiments, the waveguide 202 and the macro optic structure 204 may be extruded as separate pieces. In some example embodiments, the waveguide and macro optic hybrid assembly 200 may be supported and clamped together by a frame, such as a frame of a luminaire, or by other means. For example, the waveguide 202 and the macro optic structure 204 may be attached to each other using clamps and/or other fasteners.

In some example embodiments, the relative proportions of the light that enters the light receiving surfaces 208, 210, 212 may be changed by changing the position of the light source 120 relative to the light receiving surfaces 208, 210, 212. For example, more of the light that is emitted by the light source 120 may be directed toward the light receiving surface 208 by positioning the light source 120 closer to the light receiving surface 208. Alternatively, the portion of the light that enters the first wing segments 234 and the second wing segment 236 of the macro optic structure 204 may be increased by increasing, within a range, the space between the light source 120 and the light receiving surface 208.

In some example embodiments, the waveguide and macro optic hybrid assembly 200 may have shapes other than the shapes shown in FIG. 2 without departing from the scope of this disclosure. In some example embodiments, the height of the waveguide 202 is approximately 4 inches, the width of the waveguide 202 is approximately 4 millimeters, and the length (i.e., depth into the page) of the waveguide 202 is approximately 4 feet. In some example embodiments, the light emitting surfaces 222, 224 may extend out approximately 4 mm beyond the respective surfaces 220, 226 of the waveguide 202. In some alternative embodiments, the waveguide and macro optic hybrid structure 200 may have different dimensions than the example dimensions provided above. In some example embodiments, the macro optic structure 204 may extend longitudinally along the entire length of the waveguide 202. Alternatively, the macro optic structure 204 may extend longitudinally for less than the entire length of the waveguide 202.

In some example embodiments, one or more of the surfaces 208, 210, 212, 214, 216, 218, 222, and 224 may be flat, curved, or a combination of flat and curved surfaces. Similarly, in some example embodiments, one or more of the surfaces 220, 226, 228, and 240 may be flat, curved, or a combination of flat and curved surfaces. In some example embodiments, the first wing segment 234 or the second wing segment 236 may be omitted.

Figure 3:
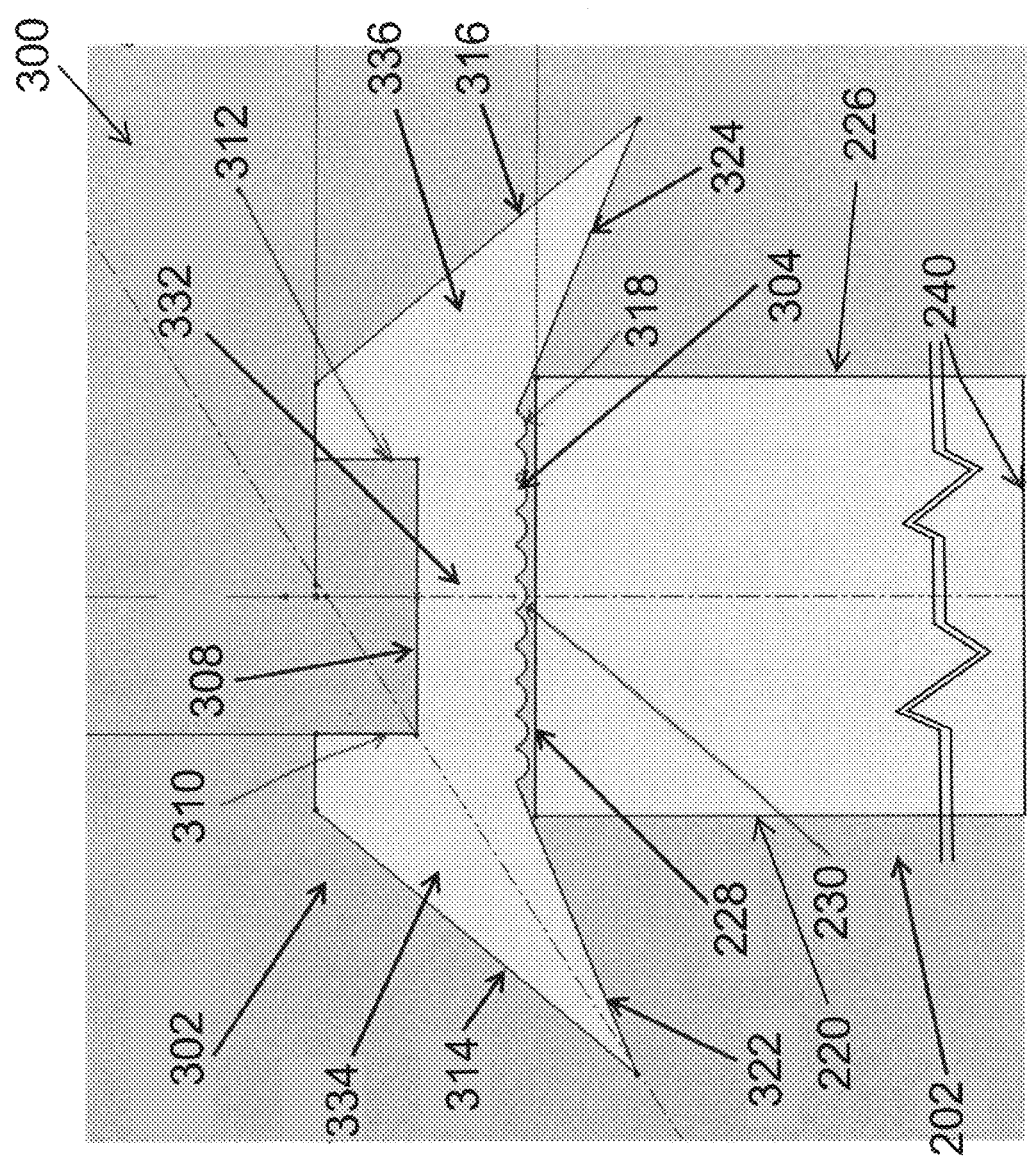
FIG. 3 is a section view of a waveguide and macro optic hybrid assembly according to an example embodiment.

FIG. 3 is a section view of a waveguide and macro optic hybrid assembly 300 according to an example embodiment. Referring to FIG. 3, the waveguide and macro optic hybrid assembly 300 functions in substantially the same manner as described with respect to the waveguide and macro optic hybrid assembly 200 of FIG. 2. The waveguide and macro optic hybrid assembly 300 may also be made from the same material and in a similar manner as the waveguide and macro optic hybrid assembly 200.

As illustrated in FIG. 3, the waveguide and macro optic hybrid assembly 300 includes the waveguide 202 and the macro optic structure 302. The waveguide 302 includes light emitting surfaces 220, 226, 240 and a light receiving surface 228. The macro optic structure 302 includes a middle segment 332, a first wing segment 334, and a second wing segment 336. The middle segment 332 is between the first wing segment 334 and the second wing segment 336. The macro optic structure 302 also includes light receiving surfaces 308, 310, 312 and a light emitting surface 318. The first wing segment 334 includes a light reflecting surface 314 and a light emitting surface 322. The second wing segment 336 includes a light reflecting surface 316 and a light emitting surface 324.

As illustrated in FIG. 3, the first wing segment 334 extends out beyond the light emitting surface 220 of the waveguide 202 on one side of the waveguide and macro optic hybrid assembly 300, and the second wing segment 336 extends out beyond the light emitting surface 226 of the waveguide 202 on an opposite side of the waveguide and macro optic hybrid assembly 300. Light from a light source, such as the light source 120 of FIGS. 1 and 2, enters and exits the macro optic structure 302 in substantially the same manner as described with respect to the macro optic structure 204 of FIG. 2.

In some example embodiments, the macro optic structure 302 includes the light emitting surface 318 that has an optical pattern 304. As compared to the light emitting surface 218 of the macro optic structure 204 of FIG. 2, the optical pattern 304 may result in a different distribution of the light that exits the macro optic structure 302 through the light emitting surface 318 and enters the waveguide 202 through the light receiving surface 228 of the waveguide 202. The distribution of light resulting from the optical pattern 304 may result in the light emitted through the light emitting surfaces 220, 226 of the waveguide 202 having a light distribution that is different from the light distribution resulting from the light emitting surface 218 of FIG. 2 that lacks a particular optical pattern. For example, the optical pattern 304 may compensate for the change in light distribution resulting from some of the light from the light source 120, that may otherwise enter the waveguide 202, entering the macro optic structure 302 through the light receiving surfaces 310, 312 and exiting through the light emitting surfaces 322, 324 of the first wing segment 334 and the second wing segment 336. In general, the optical pattern 304 on the light emitting surface 318 of the macro optic structure 302 may result in a desired distribution of the light emitted by the waveguide 202 of the waveguide and macro optic hybrid assembly 300 and a light fixture that includes the waveguide and macro optic hybrid assembly 300. In some example embodiments, the light emitting surface 318 may include optical patterns other than shown in FIG. 3.

In some example embodiments, one or more of the surfaces 308, 310, 312, 314, 316, 318, 322, and 324 may be flat, curved, or a combination of flat and curved surfaces. Similarly, in some example embodiments, one or more of the surfaces 220, 226, 228, and 240 may be flat, curved, or a combination of flat and curved surfaces. In some example embodiments, the first wing segment 334 or the second wing segment 336 may be omitted.

Figure 4:
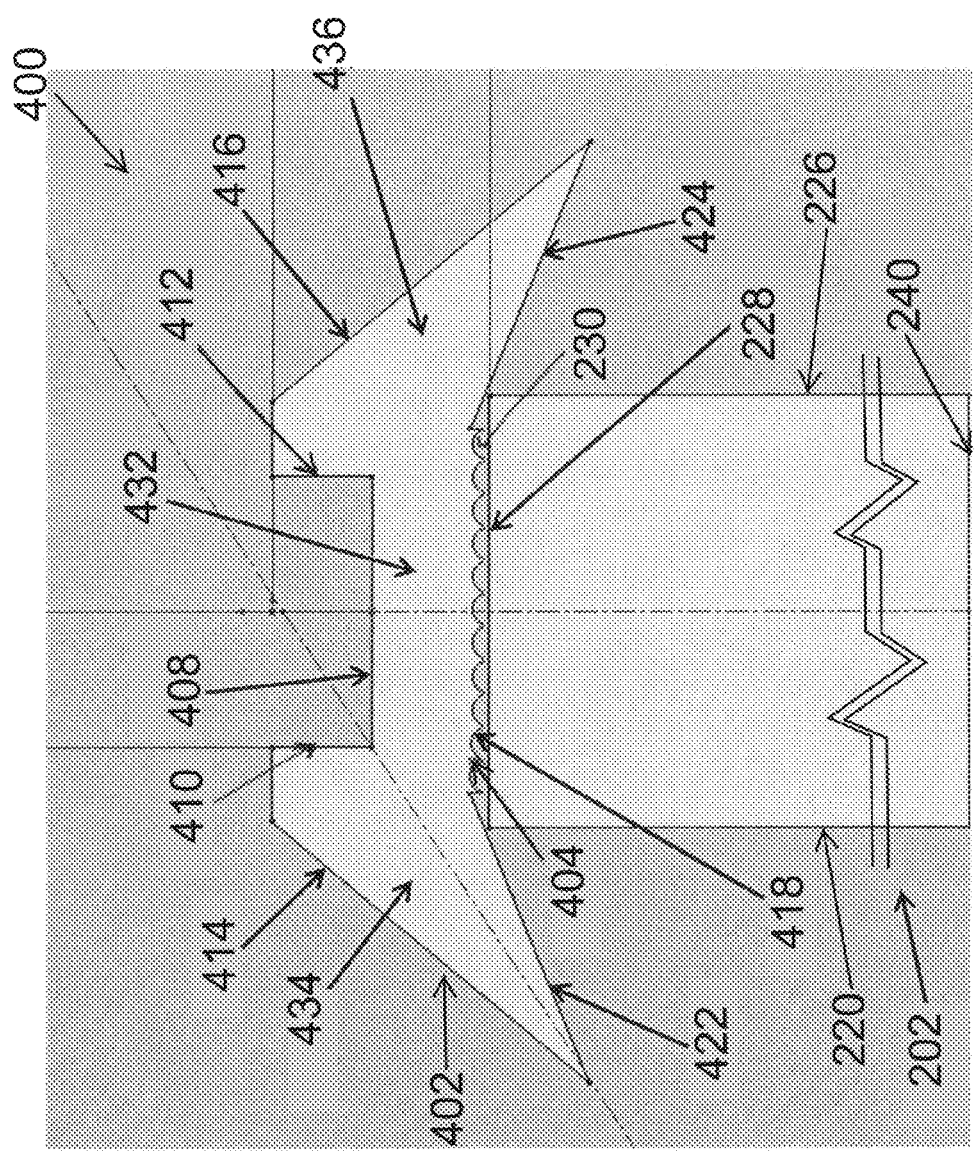
FIG. 4 is a section view of a waveguide and macro optic hybrid assembly according to an example embodiment.

FIG. 4 is a section view of a waveguide and macro optic hybrid assembly 400 according to an example embodiment. Referring to FIG. 4, the waveguide and macro optic hybrid assembly 400 functions in substantially the same manner as described with respect to the waveguide and macro optic hybrid assembly 200 of FIG. 2 and the waveguide and macro optic hybrid assembly 300 of 3. The waveguide and macro optic hybrid assembly 400 may also be made from the same material and in a similar manner as the waveguide and macro optic hybrid assembly 200, 300.

The waveguide 302 includes light emitting surfaces 220, 226, 240 and a light receiving surface 228. The macro optic structure 402 includes a middle segment 432, a first wing segment 434, and a second wing segment 436. The middle segment 432 is between the first wing segment 434 and the second wing segment 436. The macro optic structure 402 also includes light receiving surfaces 408, 410, 412 and a light emitting surface 418. The first wing segment 434 includes a light reflecting surface 414 and a light emitting surface 432. The second wing segment 436 includes a light reflecting surface 416 and a light emitting surface 424.

As illustrated in FIG. 4, the first wing segment 434 extends out beyond the light emitting surface 220 of the waveguide 202 on one side of the waveguide and macro optic hybrid assembly 400, and the second wing segment 436 extends out beyond the light emitting surface 226 of the waveguide 202 on an opposite side of the waveguide and macro optic hybrid assembly 400. Light from a light source, such as the light source 120 of FIGS. 1 and 2, enters and exits the macro optic structure 402 in substantially the same manner as described with respect to the macro optic structure 204 of FIG. 2.

In some example embodiments, the macro optic structure 402 includes the light emitting surface 418 that has an optical pattern 404 in the surface 418 of the macro optic structure 402. As illustrated in FIG. 4, the optical pattern 404 in the surface 418 of the macro optic structure 402 is different from the optical pattern 304 illustrated in FIG. 3. In some example embodiments, the optical pattern 404 may result in the light emitted through the light emitting surfaces 220, 226 of the waveguide 202 of the waveguide and macro optic hybrid assembly 400 having a light distribution that is different from the light distribution of the light emitted through the light emitting surfaces 220, 226 of the waveguide 202 of the waveguide and macro optic hybrid assembly 200, 300. In some example embodiments, the light emitting surface 318 may include optical patterns other than shown in FIG. 4 including a mix of different patterns.

In some example embodiments, one or more of the surfaces 408, 410, 412, 414, 416, 418, 422, and 424 may be flat, curved, or a combination of flat and curved surfaces. Similarly, in some example embodiments, one or more of the surfaces 220, 226, 228, and 240 may be flat, curved, or a combination of flat and curved surfaces. In some example embodiments, the first wing segment 434 or the second wing segment 436 may be omitted.

Figure 5:
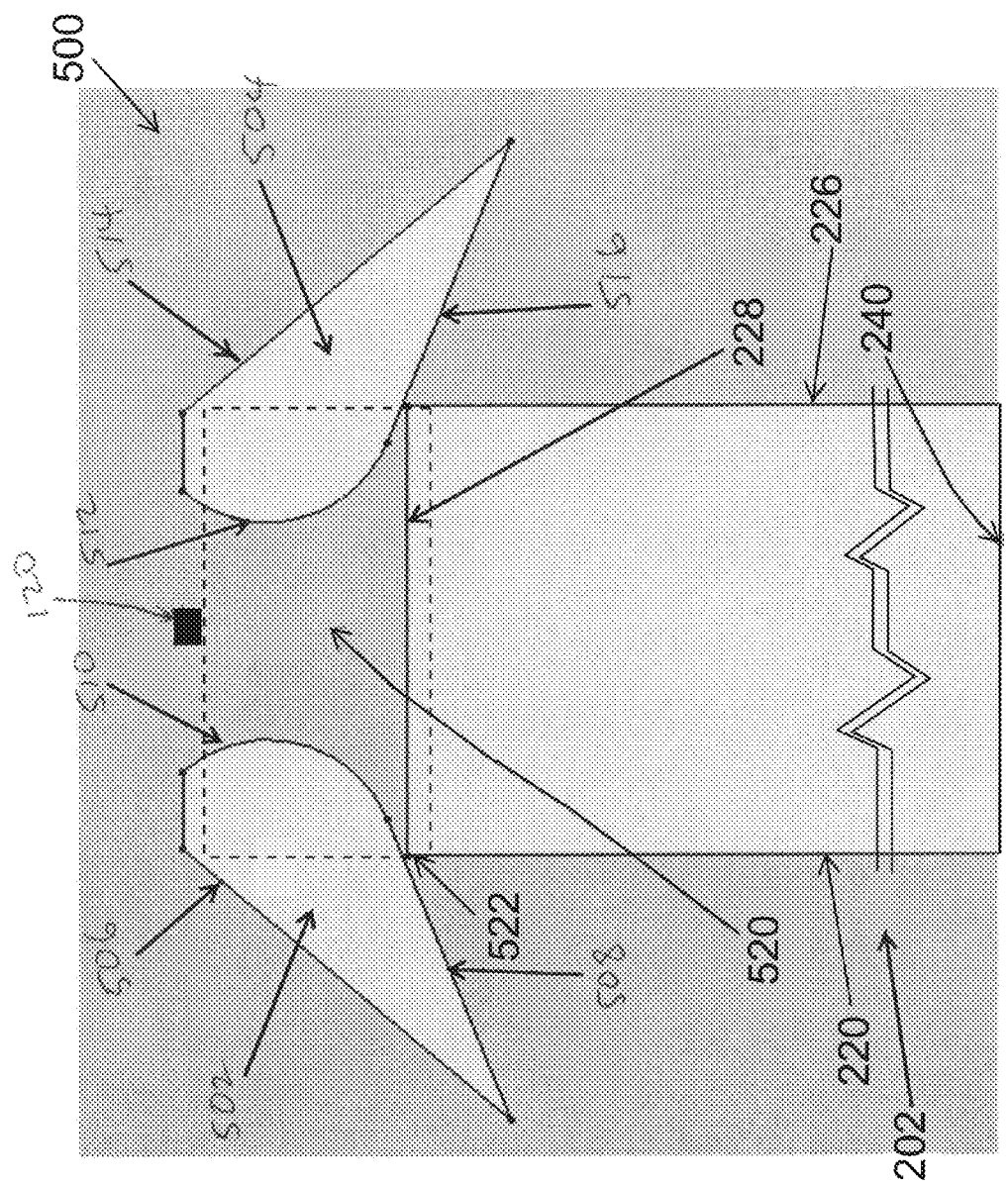
FIG. 5 is a section view of a waveguide and macro optic hybrid assembly according to an example embodiment.

FIG. 5 is a section view of a waveguide and macro optic hybrid assembly 500 according to an example embodiment. Referring to FIG. 5, a waveguide and macro optic hybrid assembly 500 includes the waveguide 202, a first macro optic wing 502, and a second macro optic wing 504. The first macro optic wing 502 and the second macro optic wing 504 are separated by an air gap 520. The first macro optic wing 502 includes a light receiving surface 510, a light reflecting surface 506, and a light emitting surface 508. The second macro optic wing 504 includes a light receiving surface 512, a light reflecting surface 514, and a light emitting surface 16.

As illustrated in FIG. 5, the first macro optic wing 502 extends out beyond the light emitting surface 220 of the waveguide 202 on one side of the waveguide and macro optic hybrid assembly 500, and the second macro optic wing 504 extends out beyond the light emitting surface 226 of the waveguide 202 on an opposite side of the waveguide and macro optic hybrid assembly 500.

A portion of the light emitted by the light source 120 may enter the first macro optic wing 502 through the light receiving surface 510 and may be emitted through the light emitting surface 508 after being reflected off the light reflecting surface 506. Light that is emitted through the light emitting surface 508 is directed generally toward the area below the waveguide and macro optic hybrid assembly 500. Another portion of the light emitted by the light source 120 may enter the second macro optic wing 504 through the light receiving surface 512 and may be emitted through the light emitting surface 516 after being reflected off the light reflecting surface 516. Light that is emitted through the light emitting surface 516 is directed generally toward the area below the waveguide and macro optic hybrid assembly 500. The light reflecting surfaces 506, 514 may reflect light, for example, as a result of TIR.

A portion of the light from the light source 120 may enter the light receiving surface 228 of the waveguide 202 and may be emitted through the light emitting surfaces 220, 226, 240 of the waveguide 202. In some example embodiments, reflector(s) 522 may be positioned on one or both sides of an air gap 520 to reflect light from the light source 120 toward light receiving surface 228 of the waveguide 202 and toward the light receiving surfaces 510, 512.

In some example embodiments, the portions of the light from the light source 120 emitted through the light emitting surfaces 222, 224 increase the illumination of the area/surface below the waveguide and macro optic hybrid assembly 500 (in the orientation shown in FIG. 2).

In some example embodiments, the waveguide 202, the first macro optic wing 502, and the second macro optic wing 504 may be made from acrylic or other similar material and using methods such as molding known those of ordinary skill in the art with the benefit of this disclosure. In some example embodiments, the waveguide 202, the first macro optic wing 502, and the second macro optic wing 504 may be made by extrusion.

In some example embodiments, the waveguide 202, the first macro optic wing 502, and the second macro optic wing 504 may have shapes other than the shapes shown in FIG. 5 without departing from the scope of this disclosure. In some example embodiments, one or more of the surfaces 506, 508, 510, 512, 514, 516 may be flat, curved, or a combination of flat and curved surfaces. In some example embodiments, the first macro optic wing 502 or the second macro optic wing 504 may be omitted.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. An edge-lit waveguide and macro optic hybrid assembly for a lighting fixture, comprising:
    a waveguide having a light receiving surface and a light emitting surface; and
    a macro optic structure comprising a first wing segment and a second wing segment, wherein a light emitting surface of the macro optic structure that is between the first wing segment and a second wing segment faces the light receiving surface of the waveguide, wherein the first wing segment extends out beyond the waveguide on a first side of the waveguide, wherein a light emitting surface of the first wing segment is spaced from a first broad light emitting surface of the waveguide and forms an acute angle with the first broad light emitting surface of the waveguide, wherein the second wing segment extends out beyond the waveguide on a second side of the waveguide, and wherein a light emitting surface of the second wing segment is spaced from a second broad light emitting surface of the waveguide and forms a second acute angle with the second broad light emitting surface of the waveguide.

2. The hybrid assembly of claim 1, wherein the macro optic structure further comprises a middle segment between the first wing segment and the second wing segment and wherein the light emitting surface of the macro optic structure is in the middle segment.

3. The hybrid assembly of claim 1, wherein the light receiving surface and the light emitting surface of the waveguide are on opposite ends of the waveguide from each other, wherein the light emitting surface of the waveguide emits a first portion of a light from a light source toward an area below the waveguide, wherein the light emitting surface of the first wing segment emits a second portion of the light toward the area below the waveguide, and wherein the light emitting surface of the second wing segment emits a third portion of the light toward the area below the waveguide.

4. The hybrid assembly of claim 3, wherein the first wing segment comprises a first light reflecting surface to reflect the second portion of the light toward the light emitting surface of the first wing segment and wherein the second wing segment comprises a second light reflecting surface to reflect the third portion of the light toward the light emitting surface of the second wing segment.

5. The hybrid assembly of claim 1, wherein the macro optic structure comprises an optical pattern on the light emitting surface of the macro optic structure.

6. The hybrid assembly of claim 1, wherein the light emitting surface of the macro optic structure and the light receiving surface of the waveguide partially bound an air gap.

7. The hybrid assembly of claim 1, wherein the first broad light emitting surface and the second broad light emitting surface are on opposite sides of the waveguide.

8. The hybrid assembly of claim 1, wherein the waveguide and the macro optic structure are made from acrylic.

* * * * *